Dec. 25, 1934.   G. L. KILLIAN   1,985,543
BEEHIVE CONSTRUCTION
Filed May 31, 1933
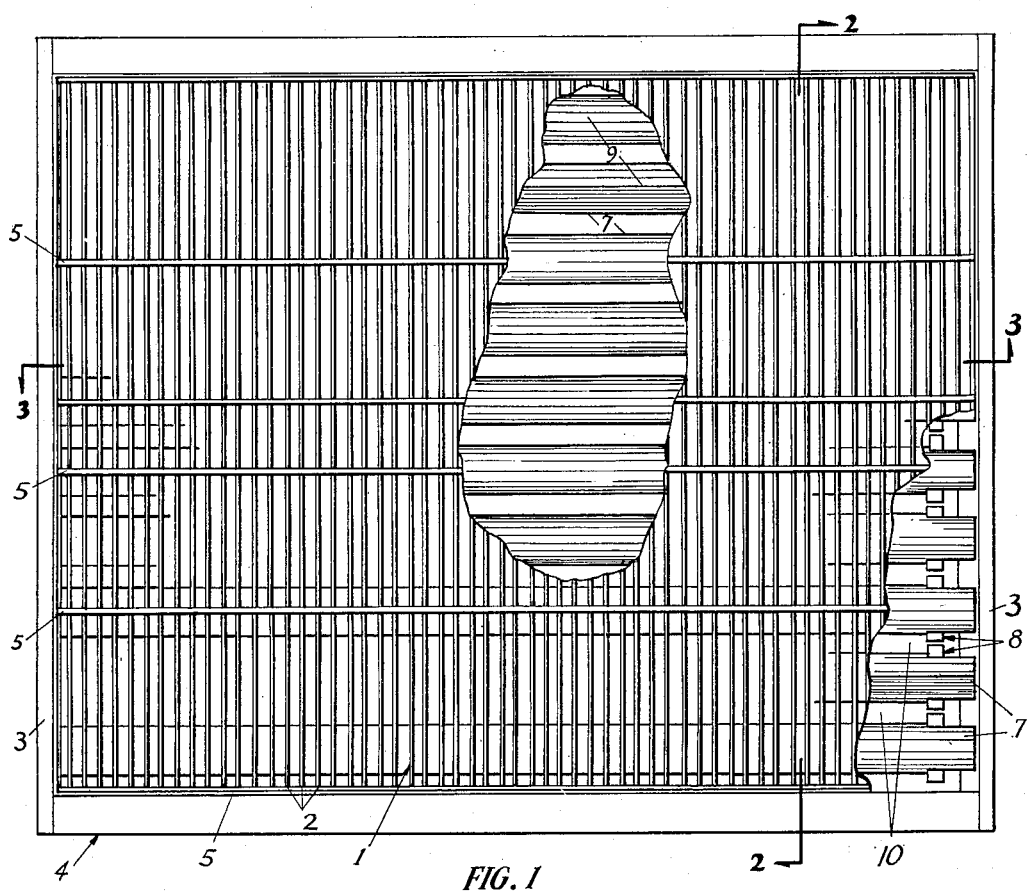
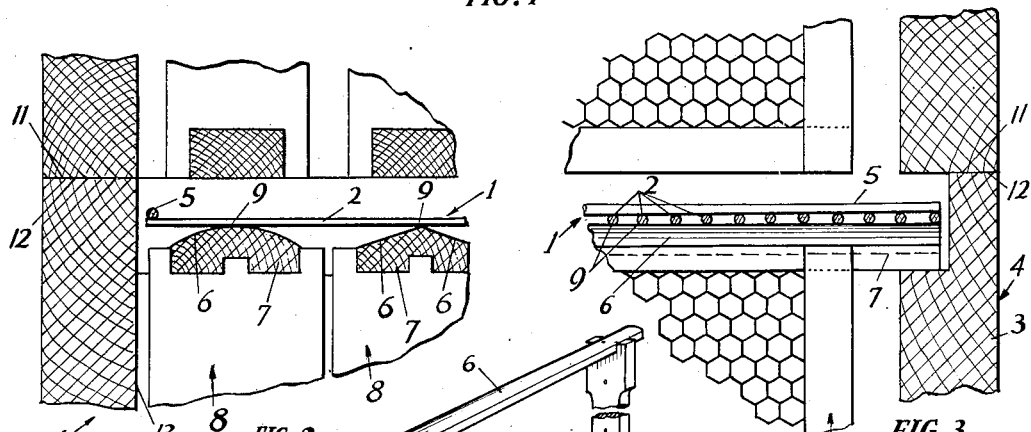
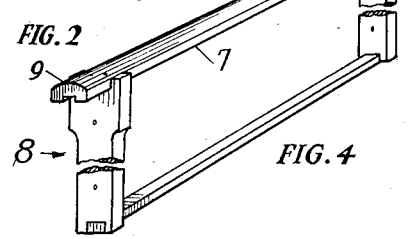
INVENTOR.
GEORGE L. KILLIAN
BY
ATTORNEY.

Patented Dec. 25, 1934

1,985,543

UNITED STATES PATENT OFFICE 1,985,543

BEEHIVE CONSTRUCTION

George L. Killian, Los Angeles, Calif.

Application May 31, 1933, Serial No. 673,681

4 Claims. (Cl. 6—4)

This invention relates to improvements in honey board construction, which will admit the passage of worker bees but will prohibit the passage of the queen bee, in combination with an improved frame structure upon which said honey board rests.

An important object of the invention is to devise a honey board made entirely of relatively heavy gauge basic steel wire, consisting of horizontally and laterally spaced wires spot welded together where they cross, which will permit of rather rough usage and which can be placed in a vat of water, heated and cleaned.

Another object of the invention is to simplify the manufacture of honey boards, reduce the number of parts, rigidify the frame, thus preventing sagging, increase the space for bee travel between the brood chamber and the overlying chamber or super, and eliminate the wood frame, thus permitting bee travel up the sides of the hive where the bees are usually accustomed to travel.

Another object of the invention is to provide an all metal grid honey board which will reduce injury of the bees and which may be easily treated to prevent corrosion and decay.

Another important object of the invention is to provide a plurality of edge supports for the honey board, from which it may be easily detached, this novel improvement consisting of arcuating, convexing or tapering that portion of the frame member upon which all the wires, permitting bee-passage, rest. By virtue of the latter improvement in the frame, a bee-perch is obtained and greater ease is afforded the worker bees in traveling from the brood chamber to the super when their honey sacs are heavy laden with nectar. The latter construction also improves ventilation.

Another object resides in the elimination of joints in the beehive structure, thereby preserving the life of the bees from cold and the elements. Frames of bee excluders become easily warped and shrink on account of their frail construction, and when thus placed between the brood chamber and the super, large cracks are sometimes noticed to appear.

In the drawing:

Fig. 1 is a plan view, approximately to scale, of the invention as applied to the brood chamber of the beehive, there being portions of the honey board broken away to disclose the spacing of the brooder frames therebeneath upon which the honey board rests.

Fig. 2 is a fragmentary section, approximately full size, taken at the opposite sides of the hive on line 2—2 of Fig. 1, with a portion of the super shown in position above the brood chamber.

Fig. 3 is a fragmentary section, approximately full size, taken at the opposite sides of the hive on line 3—3 of Fig. 1, with a portion of the super shown in position above the brood chamber.

Fig. 4 is a perspective view of the improved frame.

My improved honey board comprises an all metal rectangular grid frame 1, consisting of a plurality of equally spaced apart horizontal round wires 2, disposed parallel to the opposite sides 3, of the brood chamber 4, and a plurality of preferably round spaced lateral wires 5, overlying the wires 2, the joints formed at the intersections of the wires 2 and 5 being firmly joined together, by electric spot welding, the lateral outside wires 5 of the grid forming frame pieces therefor.

The grid 1, as previously stated, rests upon the beveled faces 6, of the top bars 7, forming a part of the brood frames 8. Said grid occupies approximately the entire area of the open space occurring between the walls of either the brood chamber or super forming the beehive. This construction of beveling or transversely upwardly tapering one or more of the top bars is also considered a part of the present invention and a necessary prerequisite thereto; for with the point contact support 9, formed at the crest of the arch of the convexity or taper on which the closely spaced wires 2 rest, the grid is made less liable to distortion upon removal than if it had to be stripped off from the full width of the bar.

The brood frames 8 with their improved beveled or tapered top bars are shown in perspective in Fig. 4. The construction of these frames other than with this improvement is well known.

Thus it will be noted upon reference to Fig. 1 how the wires 2, which lead across the open spaces 10 between the frames 8 and between the frames and the walls of the beehive insure the least obstruction to the passage of the worker bees to the bee-space thereabove. It will be observed further upon reference to Fig. 2 how the worker bees may utilize a portion of the beveled or tapered surfaces between the closely spaced wires 2, as a bee-rest or bee-climb and permit the use of their wings as a lift or brace to assist them partially up the incline by extending them first thru the wires, incident to passing thru the network of the grid with their heavy laden sacs of nectar. The top bars 7 are bevelled in such a manner as to form surfaces inclined considerably less than forty-five degrees, which are easy for the laden worker bees to ascend.

A loaded bee carries its hind legs well forward under the body. A bee with empty honey sac stretches its hind legs out behind.

It will therefore be obvious how that beveling or tapering the top bars as afore described contributes largely to facilitating rapid transit, with less irksomeness to the worker bees in passing from the section frames thru the honey board, and fosters contentment in the colony in general.

Previously arranged honey boards disposed between the brood chamber and the super, disclose bee-space both above and below the frame network. Such construction causes the bees to form burr comb between these portions of the beehive and thereby join the super frames to those in the chamber below.

This work of forming the burr comb may be greatly reduced, if it is seen to that there is no more bee-space allowed than is necessary.

The present invention, as an improvement over the old method, contemplates bee-space above the network only, as a cure of this disadvantage.

Referring to Figs. 2 and 3 the correct relation of super, grid and brood chamber, of the present invention, will be noted. The spacing of the section frames 8 in Figs. 1 and 2 is also nearly true to life.

Thru the elimination of the wood frame, usually bound around the edge of the grid, the bottom edge 11 of the super now may rest upon the top edge 12 of the brood chamber. These joints are usually well fitting and, when not separated by a warped honey board frame, will prevent air and cold from passing into the beehive.

It is also generally well known that bees traveling to and from the supers, usually go via the walls of the hive and especially the front walls. With my improved grid resting on the frames as shown, it will be seen there is ample bee-space afforded for the bees to climb all the walls of the beehive and pass unimpeded immediately thru the grid without making any detour whatsoever. From an inspection of Fig. 2 will be seen the necessity for beveling the top faces of the top bars to secure the foregoing advantage of wall climbing. Were the top frame of the sections 8 not beveled or tapered as shown, it would be impossible for the bees to pass up the wall 13 and around the wire 5; and thus two of the most important avenues of traffic would be shut off entirely.

Probably one of the greatest drawbacks confronting the bee keeper, against the use of the honey board, is the difficulty of keeping it clean, sanitary and free from corrosion.

Present day devices, disclose both plate and wire construction, bound by a wood frame usually placed between the super and the brood chamber.

There are many reasons contributing to the abolishment of the zinc plate idea. Among them is the fact that the burrs occurring at the punches, cause injury to the bees. The number of punched holes occurring therein also reduces bee passage. The frames warp and the metal sags at the center. Zinc metal expands and contracts greatly by change in temperature and as said before the frames are hard to keep clean. Zinc frames on that account are being very generally supplanted by wire frames.

Aside from the present wire, wood and metal frames obstructing the passage of the bees up the sides of the beehive as stated supra, there is also the problem of the frames warping, the wires getting out of parallelism; and they have been also objected to because they become covered with propolis or wax making them very difficult to clean.

The method of cleaning wire honey boards with wood and metal frames now consists in treating them with a bleaching powder solution to destroy the wax and make it brittle. It may be then removed by a wire brush.

This work is arduous and requires considerable time. Too, in storing the honey boards away with the wood frames, they are found to be bulky and to present a mussy appearance.

With my all metal flat grid, the apiarian simply dumps it into a vat of acidulated water, heating it sufficiently to separate the foreign substances, whereupon it may be removed and allowed to dry.

It may then be compactly stored away, and if any discoloring or detection of wear is noted, it may be easily sprayed or dipped in a preservative solution.

I claim:

1. In a beehive, a honey board comprising an all metal wire grid consisting of a plurality of relatively stiff horizontal equally spaced apart wires, and a plurality of laterally spaced apart wires, the outer-most of said laterally spaced wires, forming frame pieces for said grid, and frame members having top cross bars disposed athwartwise and beneath said horizontal wires, the faces of said cross bars adjacent the sides of said beehive being beveled or tapered, whereby to provide bee passage between the latter bars and said outer lateral wires, for worker bees traveling up the sides of said hive.

2. The combination with a super and a brood chamber forming a beehive, the one mounted upon the other, and frame sections in said super and brood chamber, there being an intervening space between the bottoms of the frames of the super and the tops of the frames of the brood chamber; of a honey board occupying a portion of the space aforestated and resting upon the frames of said brood chamber, and there being bee-space between said honey board and the bottoms of the frames in said super, said frame sections including a top cross bar provided with an upwardly directed taper forming an apical seat, and said honey board comprising a plurality of equally spaced apart round wires, and a plurality of laterally spaced transverse wires overlying said horizontal wires, the outer-most of said lateral wires forming frame pieces for said honey board and cooperating with the tapered sides of the frame sections adjacent the sides of the beehive to provide bee-space for the worker bees traveling up the sides of the hive, and said equally spaced wires resting upon said seat.

3. The combination with a super and a brood chamber forming a beehive, the one mounted upon the other, and frame sections in said super and brood chamber, there being an intervening space between the bottoms of the frames of the super and the tops of the frames of the brood chamber; of a honey board occupying a portion of the space aforestated and resting upon the frames of said brood chamber, and there being bee-space between said honey board and the bottoms of the frames in said super, said honey board comprising an all metal wire grid consisting of a plurality of equally spaced wires to form a barrier for the queen bee and a series of unobstructed passages for the worker bees, a plurality of laterally spaced wires joined to said equally spaced wires, the outer-most of said laterally spaced wires being disposed along the ends of said equally spaced wires, to form frame pieces therefor, said frame sections being spaced at right angles to said equally spaced wires and that section which is disposed along the side of the beehive including a top cross bar having beveled sides, whereby the worker bees crawling up the sides of said beehive may have access to said super by passing between said outer-most wires and the beveled sides of said cross bars.

4. As an article of manufacture a rigid all wire metal rectangular honey frame grid comprising a plurality of relatively stiff horizontal wires equally spaced apart from side to side of the grid, to form a queen bee barrier, and also a series of unobstructed passages for the worker bees traveling between the brooder and the super of a hive, transverse wires disposed along the ends of the first said wires to form frame pieces therefor, and other transverse wires terminating within the boundary of the outer horizontal wires occurring at spaced intervals between said end transverse wires, all of said transverse wires being on one side of the first mentioned wires.

GEORGE L. KILLIAN.